Jan. 7, 1958

S. V. LINDBLAD 2,819,411

ELECTRIC ENERGY REGULATORS

Filed Dec. 9, 1953

INVENTOR
STURE VIKTORINUS LINDBLAD
BY

ATTORNEYS

INVENTOR
STURE VIKTORINUS LINDBLAD
BY

ATTORNEYS

United States Patent Office 2,819,411
Patented Jan. 7, 1958

2,819,411

ELECTRIC ENERGY REGULATORS

Sture Viktorinus Lindblad, Stensholm, Huskvarna, Sweden, assignor to Stensholms Fabriks Aktiebolag, Huskvarna, Sweden, a limited company of Sweden Application December 9, 1953, Serial No. 397,173

Claims priority, application Sweden December 9, 1952

14 Claims. (Cl. 307—35)

The present invention relates to regulators of the kind which are adapted to be used for regulating the amount of electric energy supplied to electrical apparatus, primarily electrical heating apparatus, such as electric hot-plates and ovens, such regulators being in the following called electric energy regulators, and the invention relates more particularly to electric energy regulators which operate by intermittently connecting the heating resistance or other load to the source of current.

Electric energy regulators are known which comprise only one periodically operating contact device, a so called regulator contact. Electric energy regulators are also known in which one regulator contact is combined with ordinary manually operated contacts for the closing and opening of circuits. In the latter kind of regulators it is possible to let the regulator contact control one or more circuits within different ranges, or to combine ranges for continuous energy regulation with certain fixed settings, as in an ordinary circuit breaker. Such energy regulators are described in e. g. the British patent specifications Nos. 587,947 and 587,953 and in the Swedish patent specification No. 121,024.

The more advanced arrangement disclosed in the above British patent specifications makes use of a single regulator controlled circuit for the lowest power range and of two parallel-connected circuits controlled by the same regulator contact for a higher range. Said known arrangement has the inconvenience that for the higher power range the total maximum power of the electrical apparatus is connected to and disconnected from the current source by the regulator contact, resulting in that very great variations are obtained in the temperature of the electric heating apparatus, in case the load consists of such an apparatus, in that because of the large amount of energy supplied during each connecting-in period, the temperature rises very rapidly in order to drop rapidly during the following currentless interval. In addition to said undesired variation of temperature the arrangement in question has the inconvenience that the rush of current from the supply system becomes very heavy, when the regulator connects the load to the system.

The present invention primarily contemplates improvements in energy regulator connections of the kind, in which a load, for instance a resistance, is connected in series with a regulator contact, comprising a temperature sensitive element, such as a bi-metallic spring, arranged to be heated by the current flowing to the load or flowing through a resistance connected in parallel therewith, so that said regulator contact will intermittently connect the load to and disconnect the same from the current supply.

It is an object of the invention to reduce, in such energy regulator connections, the non-desirable big current impacts on the electric net work. In cases where the load consists of a heating apparatus or the like, it is a further object of the invention to provide an energy regulator, which is capable of keeping the temperature variations of the load within comparatively narrow limits.

With these objects in view there has been provided, according to the invention, a regulator of the kind set forth which comprises a turnable shaft and a curve-disc on said shaft for adjusting the regulator contact to positions corresponding to different mean powers, the curve-disc having within two or more separate sectors such a profile, that on the turning of the curve-disc the mean power is reduced to a minimum value each time one of the sectors is made operative, and is increased to a maximum value on turning of the curve-disc through an angle corresponding to the sector in question, and which also comprises, arranged on the said shaft, at least one other curve-disc adapted to control a switch or circuit breaker for a second load, for example a second heating resistance, in such a manner that said latter load is kept disconnected as long as one of the sectors is in operative position but is connected into circuit as long as the next section is operative.

Other features and advantages of the invention will become apparent from the following detailed description of various embodiments with reference to the accompanying drawings.

Figure 1:
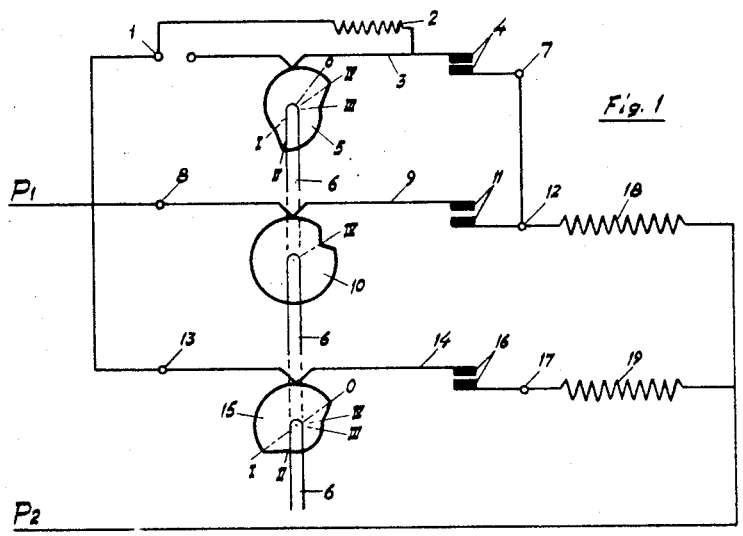
Figure 1 illustrates diagrammatically a first embodiment of an electric energy regulator according to the invention.

In Figure 1, the reference numeral 1 designates the input terminal of the regulator contact device, 2 a heating resistance for the temperature sensitive member 3, which may consist e. g. of a bimetallic spring, and 4 the regulator contact proper. The reference numeral 5 designates the curve-disc for adjusting the regulator contact, and 6 a shaft on which the curve-disc is mounted. The output terminal from the regulator contact is designated 7. For the manually operated contact devices the reference numerals 8 and 13 respectively designate the input terminals, 9 and 14 respectively the contact springs, 10 and 15 respectively the curve-discs, 11 and 16 respectively the contacts, and 12 and 17 respectively the output terminals. The reference numerals 18 and 19 designate the load circuits which are controlled by the energy regulator, the loads in this case consisting of resistances, e. g. heating resistance coils for an electric oven, a hot-plate or the like.

The embodiment of the invention illustrated in Figure 1 has three different operating ranges, which are defined by the angular position of the shaft 6. The first range corresponds to the sector 0—I, as indicated on the curve-discs. Within said range the heating resistance 18 is controlled by a regulator contact device 1—7. The second range corresponds to the sector II—III, within which the heating resistance 18 is intermittently connected into and out of circuit under control of the regulator contact device 1—7 while the heating element 19 is permanently connected into circuit by means of the contact device 13—17. In the last setting position, corresponding to angular position IV of the shaft 6, the heating element 19 is still permanently connected in the circuit by means of the contact device 13—17, while the regulator contact device 1—7 is short-circuited by the contact device 8—12, so that now also the heating element 18 is permanently connected into circuit. In this position the contact 4 may be interrupted, as shown in Figure 1, or else be closed. The first sector 0—I shown corresponds to the range for the lowest mean power, the second sector II—III to the range for the higher mean power, and the last fixed position IV to the maximum power.

This functioning is brought about in the following manner.

On turning of the shaft 6 from the 0-position, the contacts 11 and 16 remain open whereas the contact 4 is closed. The current then flows from main $P_1$ to input terminal 1 through regulator resistance 2 and further through the members 4, 7 and 12 to the load or heating resistance 18, through said resistance and back to main $P_2$. The heat generated in the resistance 2 causes the temperature of the temperature sensitive member 3 to rise, said member then bending more and more upwardly until finally it separates the contacts 4, the current in the load circuit being then interrupted. The temperature of the temperature sensitive member 3 thereafter begins to drop, and the member starts to move in the opposite direction until the contacts 4 are closed again, the current then flowing anew through the load circuit, whereafter the operation described is repeated. The amount of energy supplied intermittently to the heating resistance 18 in this manner causes the said resistance to develop a mean power which is dependent on the duration of the heating and cooling periods for the heat sensitive member 3. Said durations depend on the position of the curve-disc 5. If the curve-disc 5 is turned clockwise, the part carrying the temperature sensitive member 3 will be brought closer to the shaft 6. This results in that the member 3, in order to separate the contacts 4, must bend more which requires a higher temperature and thus also a longer heating period. The mean power of the heating resistance 18 will thus rise. Within the first sector angular position I of the shaft 6 corresponds to the highest mean power, which may be 100% of the power of the heating resistance 18 or less.

In order to get to the second higher power range, the shaft 6 has to be turned from position I to position II. Between said positions there is provided a "snap" which renders it impossible for the shaft 6 to stop in any intermediate position. The said turning of the shaft 6 brings the regulator contact to a position corresponding to the minimum value of the mean power within the sector II—III, and at the same time the contact 16 is closed by that the contact spring 14, due to the particular shape of the appertaining curve-disc 15, is brought nearer to the shaft 6. The heating resistance 19 will remain permanently connected-in during regulation within said range. On a continued turning of the shaft 6 the regulator contact 4 will, in the manner described above, give the heating resistance 18 a higher and higher mean power. Within said regulating range there is thus a fixed "base power" represented by the heating resistance 19, to which "base power" there is then added the variable mean power developed in the heating resistance 18. Compare Figure 2, which shows the conditions when each one of the heating resistances 18 and 19 represents half of the total power. With said arrangement there will thus be, within the entire regulating range, very small temperature variations in the electrical apparatus, for instance a hot-plate, which is represented by the resistances 18 and 19. At the same time the advantage is gained that the load impacts on the electrical net work become smaller, since only the power of the element 18 is intermittently connected into circuit.

Figure 3:
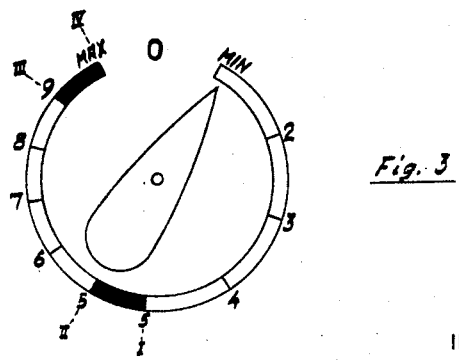
Figure 3 illustrates the setting knob provided at the end of the curve-disc shaft, and also a scale for indicating the angular position of the shaft.

From position III, which represents the maximum power within the second mean power range, one gets over a snap-device directly to the fixed position IV, where both heating elements or resistances are permanently included in the circuit in parallel with each other to give the maximum power obtainable. Said fixed position has been provided for the reason that normally one has no greater interest of a continuous mean power regulation for the highest portion of the power range. It may thus be sufficient that the heating element 18 in position III has 60–70% of its maximum power, and that from said position the regulator is switched directly over to position IV. Figure 3 shows the setting scale which belongs to the described embodiment of the energy regulator.

Figure 4:
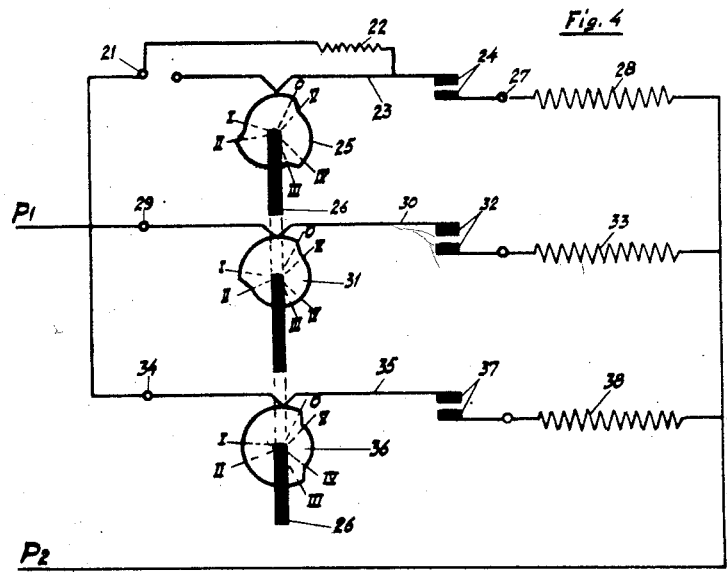
Figure 4 is a diagrammatic representation of a second embodiment of the energy regulator.
Figure 5:
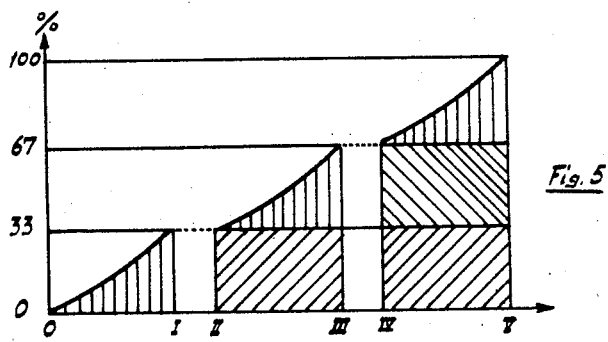
Figure 5 is a curve diagram similar to the diagram according to Figure 2 but relating to the power regulator according to Figure 4.
Figure 6:
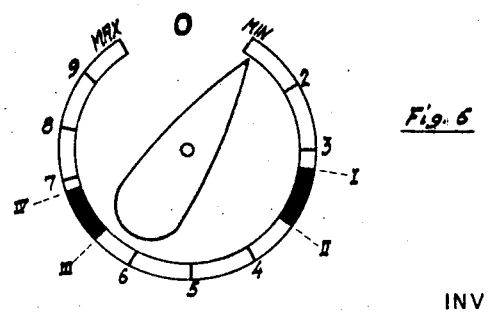
Figure 6 is a view similar to Figure 3 but appertaining to the embodiment illustrated in Figure 4.

A second embodiment of the invention is illustrated in Figure 4. The regulator device 21—27 here controls or determines the mean power of the heating resistance 28 in dependance of the angular position of the curve-disc 25, whereas the contact devices 29—32 and 34—37 connect the heating resistance 33 and 38 respectively into circuit under control of the curve-discs 31 and 36 respectively. The sector 0—I corresponding to the range for the lowest mean power is made operative by turning of the shaft 26 from its original angular position, the mean power of the heating resistance 28 during the turning of the shaft increasing from its minimum to its maximum value. This operation is repeated by the regulating circuit 21—27, 28 within the sectors II—III and IV—V respectively. Within the sector II—III the resistace 33 is permanently connected into circuit, and within the sector IV—V both the heating resistance 33 and the heating resistance 38 are permanently connected-in. If the heating resistances 28, 33 and 38 are of equal size, i. e. if each one produces one third of the total power, a mean power varying according to Figure 5 is obtained. The setting scale of the regulator in this case is illustrated in Figure 6, where the black fields I—II and III—IV indicate that snap-devices render a setting of the regulator within the said ranges impossible.

Figure 7:
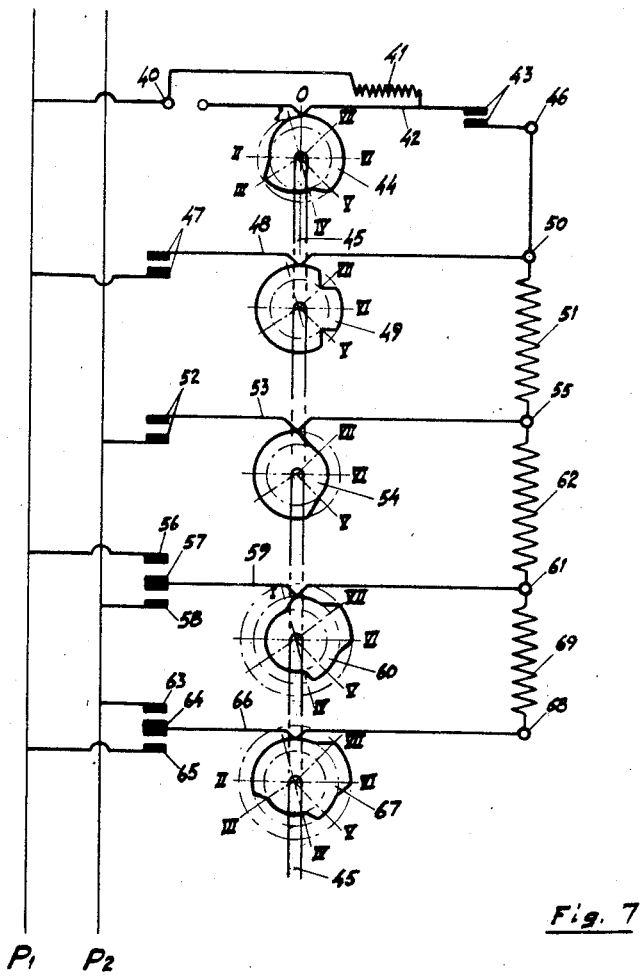
Figure 7 is a diagrammatic representation of a further embodiment.

Finally, there is shown in Figure 7 an embodiment of the invention which operates as a power regulator with continuous regulation of the mean power within part of the setting range, and as a switch device with fixed power positions within another part of the setting range. Within the first sector I—II the regulator causes the current from main $P_1$ to enter through the regulator device 40—46 and to flow through the heating resistances 51 and 62 back to main $P_2$ through a contact device 57—61, in which the contacts 57 and 58 are closed. The mean power of the heating resistances 51 and 62 is thus dependent on the position of the curve-disc 44. Via a snap-device in the sector II—III one arrives, on further turning of the shaft, to the sector III—IV where the same regulation is repeated anew, the heating resistance 69 being, however, now permanently connected into circuit through the contact device 64—68, the contacts 64 and 65 of which are closed. In principle, the same conditions thus prevail as within the two first sectors in the arrangement according to Figure 4. If the shaft is turned further to position V, only the heating 51 will be permanently connected into circuit through the contact devices 47—50 and 52—55. In the fixed position VI the heating resistances 62 and 69 are permanently connected into circuit in parallel with each other through the contact devices 52—55 and 56—57, 59—61 on the one hand, and the contact devices 63—64, 66—68 on the other hand by that the contacts 52, 56—57 and 63—64 respectively are closed. Since in the last position VII the contacts 47, 52, 56—57 and 63—64 are closed, the heating resistances 51, 62 and 69 become permanently connected into circuit in parallel with each other, representing the highest power possible.

Figure 2:
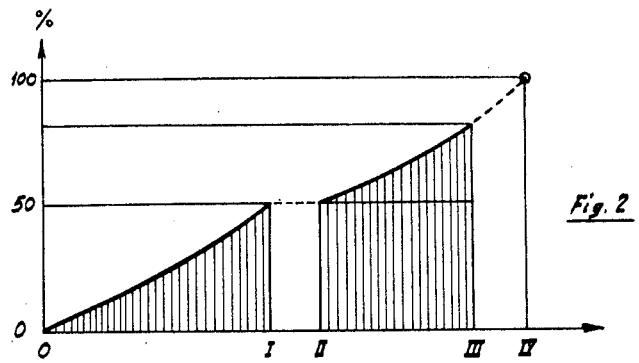
Figure 2 is a curve diagram showing the mean power supplied to the load under control of the regulator according to Figure 1 as a function of the position of the curve-disc shaft.

The shape of the mean power curve in Figures 2 and 5 corresponds to a substantially even rise of the periphery of the curve-disc within the corresponding sectors. By varying the shape of the profile of the curve-disc it is, of course, possible to vary the shape of the curves representing the mean power practically at will.

The embodiments of the invention described above constitute only a few possible realisations of the inventive idea, and the invention is therefore not restricted to the said embodiments. Furthermore, the loads controlled by the electric energy regulator according to the invention need not consist of heating resistances in electric heating apparatus, but may alternatively consist of loads of other kind, e. g. electric motors, relays, transformers, lamps et cetera.

I claim:

1. Apparatus for controlling current flow from a source of power to a plurality of electrical elements comprising contact means adapted to be connected in series with one of said elements across said source of power, adjustable means responsive to heat generated by current passing through said contact means for periodically actuating said contact means, and means for selectively connecting a second element across said source of power in parallel with the series arrangement of said one element and said contact means.

2. Apparatus for controlling current flow from a source of power to a plurality of electrical elements comprising contact means adapted to be connected in series with one of said elements across said source of power, adjustable means responsive to heat generated by current passing through said contact means for periodically actuating said contact means, and means for selectively connecting additional elements across said source of power in parallel arrangement and in parallel with the series arrangement of said one element and said contact means.

3. Apparatus for controlling current flow from a source of power to a plurality of electrical elements comprising contact means adapted to be connected in series with one of said elements across said source of power, adjustable means responsive to heat generated by current passing through said contact means for periodically actuating said contact means, and means for selectively connecting a second of said elements either in series with said series arrangement of said one element and said contact means across said source of power or in parallel with said one element and directly across said source of power.

4. Apparatus for controlling current flow from a source of power to a plurality of electrical elements comprising contact means adapted to be connected in series with one of said elements across said source of power, adjustable means responsive to heat generated by current passing through said contact means for periodically actuating said contact means, and means for selectively connecting a second of said elements either in series with said series arrangement of said one element and said contact means across said source of power or in parallel with said one element and directly across said source of power or across said source of power with said one element open circuited.

5. Apparatus for controlling current flow from a source of power to a plurality of electrical elements comprising contact means adapted to be connected in series with a series arrangement of two of said elements across said source of power, adjustable means responsive to heat generated by current passing through said contact means for periodically actuating said contact means, and means for selectively connecting said two elements and a third element across said source of power either with said three elements connected in parallel directly across said source of power or with said third element connected in parallel with the series arrangement of said series connected elements and said contact means across said source of power.

6. Apparatus for controlling current flow from a source of power to a plurality of electrical elements comprising contact means adapted to be connected in series with a series arrangement of two of said elements across said source of power, adjustable means responsive to heat generated by current passing through said contact means for periodically actuating said contact means, and means for selectively connecting said two elements and a third element across said source of power either with only one of said elements connected directly across said source of power with the other of said three elements open circuited or with said three elements connected in parallel directly across said source of power or with said third element connected in parallel with the series arrangement of said series connected elements and said contact means across said source of power.

7. Apparatus for controlling current flow from a source of power to a plurality of electrical elements comprising contact means adapted to be connected in series with a series arrangement of two of said elements across said source of power, adjustable means responsive to heat generated by current passing through said contact means for periodically actuating said contact means, and means for selectively connecting said two elements and a third element across said source of power either with only one of said elements connected directly across said source of power with the other of said three elements open circuited or with only two of said elements connected directly across said source of power with the other of said three elements open circuited or with said three elements connected in parallel directly across said source of power or with said third element connected in parallel with the series arrangement of said series connected elements and said contact means across said source of power.

8. Apparatus for controlling current flow from a source of power to a plurality of electrical elements comprising contact means adapted to be connected in series with one of said elements across said source of power, adjustable means responsive to heat generated by current passing through said contact means for periodically actuating said contact means, and means for selectively connecting a second element across said source of power in parallel with the series arrangement of said one element and said contact means, said selective control means including a plurality of cam operated contact means and unitary control means therefor.

9. Apparatus for controlling current flow from a source of power to a plurality of electrical elements comprising contact means adapted to be connected in series with one of said elements across said source of power, adjustable means responsive to heat generated by current passing through said contact means for periodically actuating said contact means, and means for selectively connecting a second element across said source of power in parallel with the series arrangement of said one element and said contact means, said selective control means including a plurality of cam operated contact means, cam operated means for regulating the periods of said means for periodically actuating said contact means and unitary control means for said two cam operated means.

10. Apparatus for controlling current flow from a source of power to a plurality of electrical elements comprising contact means adapted to be connected in series with a series arrangement of two of said elements across said source of power, adjustable means responsive to heat generated by current passing through said contact means for periodically actuating said contact means, and means for selectively connecting said two elements and a third element across said source of power either with only one of said elements connected directly across said source of power with the other of said three elements open circuited or with only two of said elements connected directly across said source of power with the other of said three elements open circuited or with said three elements connected in parallel directly across said source of power or with said third element connected in parallel with the series arrangement of said series connected elements and said contact means across said source of power, said selective control means including a plurality of cam operated contact means and unitary control means therefor.

11. Apparatus for controlling current flow from a source of power to a plurality of electrical elements comprising contact means adapted to be connected in series with a series arrangement of two of said elements across said source of power, adjustable means responsive to heat generated by current passing through said contact means for periodically actuating said contact means, and selectively positionable means for selectively connecting said two elements and a third element across said source of power, said selectively positionable means when in a first position connecting only one of said elements directly across said source of power and open circuiting the other of said elements, said selectively positionable means when in a second position connecting only two of said elements directly across said source of power and open circuiting the other of said elements, said selectively positionable means when in a third position connecting three of said elements in parallel directly across said source of power and said selectively positionable means when in a fourth position connecting said third element in parallel with the series arrangement of said two elements and said contact means across said source of power, said selective control means including a plurality of cam operated contact means, cam operated means for regulating the periods of said means for periodically actuating said contact means and unitary control means for said two cam operated means.

12. Apparatus for controlling current flow from a source of power to a plurality of electrical elements comprising contact means adapted to be connected in series with one of said elements across said source of power, means responsive to heat generated by current passing through said contact means for periodically actuating said contact means, means for adjusting the time intervals between actuations of said periodically actuating means, and means for selectively connecting a second element across said source of power in parallel with the series arrangement of said one element and said contact means.

13. Apparatus for controlling current flow from a source of power to a plurality of electrical elements comprising contact means adapted to be connected in series with one of said elements across said source of power, means responsive to heat generated by current passing through said contact means for periodically actuating said contact means, means for adjusting the time intervals between actuations of said periodically actuating means, means for selectively connecting a second element across said source of power in parallel with the series arrangement of said one element and said contact means, and unitary control means for controlling said adjusting means and said connecting means and for adjusting said adjusting means throughout its range of time interval control for each arrangement of connection of said elements provided by said connecting means.

14. Apparatus for controlling current flow from a source of power to a plurality of electrical elements comprising contact means adapted to be connected in series with one of said elements across said source of power, adjustable means responsive to heat generated by current passing through said contact means for periodically actuating said contact means for adjustable periods of time, and means for selectively continuously connecting a second element across said source of power in parallel with the series arrangement of said one element and said contact means.

References Cited in the file of this patent
UNITED STATES PATENTS

| | | |
|---|---|---|
| 1,749,718 | Randolph et al. | Mar. 4, 1930 |
| 1,867,428 | Hoorn | July 12, 1932 |
| 2,266,152 | Biebel | Dec. 16, 1941 |
| 2,395,572 | Meuer | Feb. 26, 1946 |
| 2,398,007 | Hunter | Apr. 9, 1946 |
| 2,501,964 | Roberts | Mar. 28, 1950 |
| 2,666,124 | Vogelsburg | Jan. 12, 1954 |
| 2,673,444 | Clapp | Mar. 30, 1954 |

FOREIGN PATENTS

| | | |
|---|---|---|
| 121,024 | Sweden | Mar. 2, 1948 |
| 587,947 | Great Britain | May 9, 1947 |
| 587,953 | Great Britain | May 9, 1947 |